United States Patent [19]
Friederichs et al.

[11] Patent Number: 5,927,831
[45] Date of Patent: Jul. 27, 1999

[54] PROCESS FOR THE RESTORATION OF BRAKE PRESSURE IN A MOTOR VEHICLE WITH ANTI-LOCK BRAKE SYSTEM

[75] Inventors: Otto Friederichs, Gurbsen; Konrad Rode, Seelze; Harald Köster; Hartmut Rosendahl, both of Hannover, all of Germany

[73] Assignee: WABCO GmbH, Hannover, Germany

[21] Appl. No.: 08/782,307

[22] Filed: Jan. 15, 1997

[30] Foreign Application Priority Data

Jan. 23, 1996 [DE] Germany ............... 196 02 220
Jul. 3, 1996 [DE] Germany ............... 196 26 707

[51] Int. Cl.$^6$ ........................................ B60T 8/58
[52] U.S. Cl. ............................ 303/156; 303/158
[58] Field of Search ........................... 303/156, 158

[56] References Cited

U.S. PATENT DOCUMENTS

| | | |
|---|---|---|
| 3,833,269 | 9/1974 | Trui et al. . |
| 4,320,459 | 3/1982 | Lindenman et al. ............ 303/156 |
| 5,618,088 | 4/1997 | Roll et al. .................... 303/158 |

FOREIGN PATENT DOCUMENTS

| | | |
|---|---|---|
| 19 44 610 | 4/1971 | Germany . |
| 21 64 094 | 6/1973 | Germany . |
| 22 05 787 | 8/1973 | Germany . |
| 35 43 145 | 6/1987 | Germany . |
| 35 45 676 | 6/1987 | Germany . |
| 39 03 180 | 8/1990 | Germany . |

*Primary Examiner*—Matthew C. Graham
*Attorney, Agent, or Firm*—Proskauer Rose LLP

[57] ABSTRACT

A process is disclosed for restoring brake pressure in a brake of a motor vehicle having an antilock brake system which subjects the brake to a brake regulating cycle. The brake regulating cycle comprises a pressure reduction phase, wherein the brake pressure is reduced from a deregulating pressure $P_{max}$ to a holding pressure $P_{min}$, a pressure maintenance phase, wherein the holding pressure $P_{min}$ is maintained in the brake, and a pressure restoration phase, wherein the brake pressure in the brake is increased. According to the invention, during the pressure restoration phase the brake pressure is increased with a steep pressure gradient $PG_H$ during a first pressure increase stage until a pressure level $P_K$ is reached. Thereafter the brake pressure is increased with a low pressure gradient $PG_N$ in a second pressure increase stage. The steep pressure gradient $PG_H$ is calculated as a function of $P_{max}$ and $P_{min}$ of the last regulating cycle, while the low pressure gradient $PG_N$ is calculated as a function of $P_{max}$ of the last regulating cycle. Alternatively, $PG_H$ is calculated as a function of the average value of $P_{max}$ and $P_{min}$ for several previous regulating cycles, while $PG_N$ is calculated as the average value of $P_{max}$ for several previous regulating cycles.

23 Claims, 2 Drawing Sheets

PROCESS FOR THE RESTORATION OF BRAKE PRESSURE IN A MOTOR VEHICLE WITH ANTI-LOCK BRAKE SYSTEM

BACKGROUND OF THE INVENTION

The present invention relates to a process for brake pressure restoration in a motor vehicle with an anti-lock brake system.

Anti-lock brake systems in motor vehicles function, as is known, in such manner that the rotational speeds of the wheels are sensed by means of rpm sensors and the brake pressure of a wheel is quickly lowered if it is found that it tends to lock. As a result, the wheel is able to run up again. The rapid lowering of brake pressure is followed as a rule by a brake pressure maintenance phase. Following this, the brake pressure is increased once more. This generally occurs in two phases. In a first phase, the brake pressure is increased as rapidly as possible until it is close to the previous locking or deregulating pressure (see DE-OS 21 64 094/U.S. Pat. No. 3,833,094). This rapid brake pressure increase phase serves to go as quickly as possible through the hysteresis of the wheel brakes. Following the phase of rapid brake pressure increase, a slow pressure increase phase follows as a rule and serves to approach the new locking pressure slowly. As soon as the new locking pressure is attained, a new pressure regulating cycle with rapid lowering of the brake pressure from the deregulating pressure to the holding pressure follows.

It is also already known (see DE-OS 19 44 610) to use the level of the last locking pressure as a control for aerating the brakes following a lowering of braking pressure. For this purpose, compressed air is conveyed through an adjustable choke which is adjusted by the last locking pressure during the restoration of the brake pressure. As a result, the increase in brake pressure is attenuated, and this attenuation is slight at high locking pressure and substantial at a low locking pressure.

The known types of controls which are applied during the restoration of brake pressure are designed first of all to shorten the braking distance, in that the braking pressure is held for an extended period of time just below the locking pressure, and secondly to increase comfort, in that the ABS regulating cycles are achieved with the smallest possible fluctuations of the mean brake pressure.

It is the object of the present invention to provide an even more sensitive control, which is better adapted to the road conditions during the brake pressure restoration phase during a brake regulating cycle of an anti-lock brake system (ABS), and thereby to further increase comfort during the brake regulating cycle.

SUMMARY OF THE INVENTION

A process is disclosed for restoring brake pressure in a brake of a motor vehicle having an antilock brake system which subjects the brake to a brake regulating cycle. The brake regulating cycle comprises a pressure reduction phase, wherein the brake pressure is reduced from a deregulating pressure $P_{max}$ to a holding pressure $P_{min}$, a pressure maintenance phase, wherein the holding pressure $P_{min}$ is maintained in the brake, and a pressure restoration phase, wherein the brake pressure in the brake is increased. According to the invention, during the pressure restoration stage, the brake pressure is increased with a steep pressure gradient $PG_H$ during a first pressure increase stage until a pressure level $P_K$ is reached, and thereafter the brake pressure is increased with a low pressure gradient $PG_N$ in a second pressure increase stage. The steep pressure gradient $PG_H$ is calculated as a function of $P_{max}$ and $P_{min}$ of the last regulating cycle, while the low pressure gradient $PG_N$ is calculated as a function of $P_{max}$ of the last regulating cycle. Alternatively, $PG_H$ is calculated as a function of the average value of $P_{max}$ and $P_{min}$ for several previous regulating cycles, while $PG_N$ is calculated as the average value of $P_{max}$ for several previous regulating cycles.

The invention is especially applicable in vehicles with anti-lock brake systems, and in particular in braking systems equipped with pressure sensors to monitor the brake pressures of the wheels, where a desired brake pressure or a desired gradient of the brake pressure increase can be obtained by means of a pressure regulator and variable operating pressure regulating valves (electronic EBS brake system). It is, however, also applicable to conventional anti-lock brake systems without closed loop regulation of the brake pressure, provided the data on the brake pressures is available.

BRIEF DESCRIPTION OF THE DRAWING

The invention is explained in greater detail below through the drawings, wherein.

DETAILED DESCRIPTION OF THE INVENTION

Figure 1:
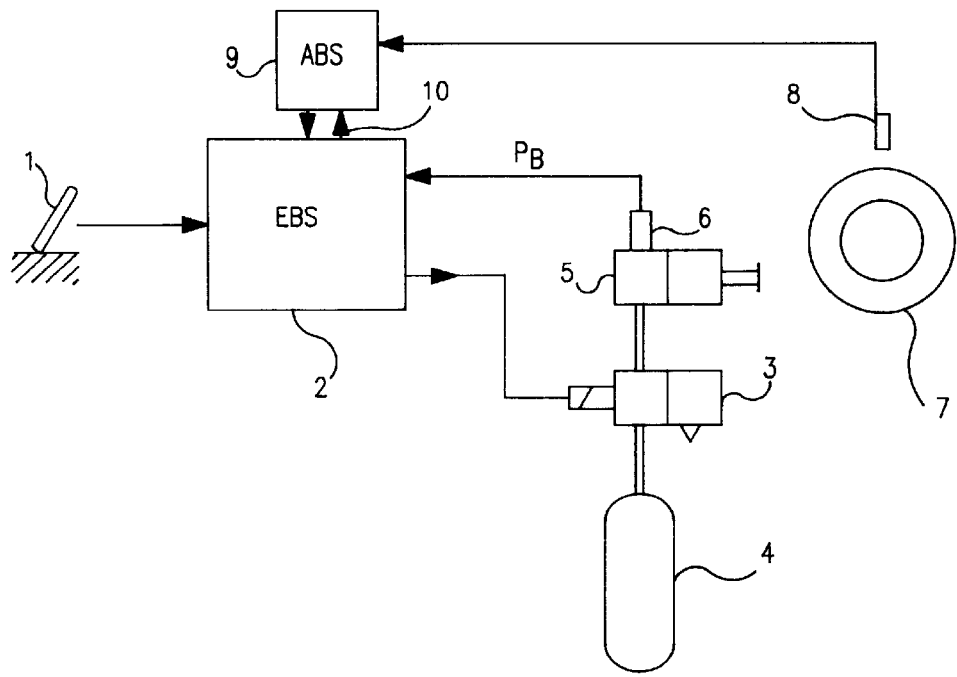
FIG. 1 shows a block diagram of a brake system in a motor vehicle equipped with an anti-lock brake system (ABS) as well as an electronic brake system (EBS)

FIG. 1 schematically shows an electronic brake system (EBS). A braking force transmitter (1) (e.g., a brake pedal) with electronic signal output is connected to a regulator (2) (EBS electronic system). The desired brake pressure coming from the braking force (1) is compared in the regulator (2) with the actual brake pressure value ($P_B$) which is sensed by a pressure sensor (6) in a brake cylinder (5). The pressure sensor (6) can also be located in a control valve (3). Any deviation from norm is compensated for by means of the control valve (3) which is controlled by the regulator (2) and which is connected to a compressed air reserve (4). It is possible to set the pressure in the brake cylinder (5) to any desired value up to the pressure in the compressed air reserve (4) by means of the above-mentioned control valve (3). The vehicle wheel (7) assigned to the brake cylinder (5) is provided with an rpm sensor (8) which is connected to an ABS-electronic system (9). The two electronic systems (9 and 2) contain microcomputers and can exchange data via bus lines (10). The two electronic systems (2) and (9) can also be combined into a single unit.

If the ABS-electronic system (9) recognizes a threatening locking of the vehicle wheel (7) during braking on a smooth road, it transmits corresponding signals to the regulator (2), causing the latter to first lower the excessively high brake pressure ($P_B$), and then to maintain it at a median value just below the locking pressure.

Figure 2:
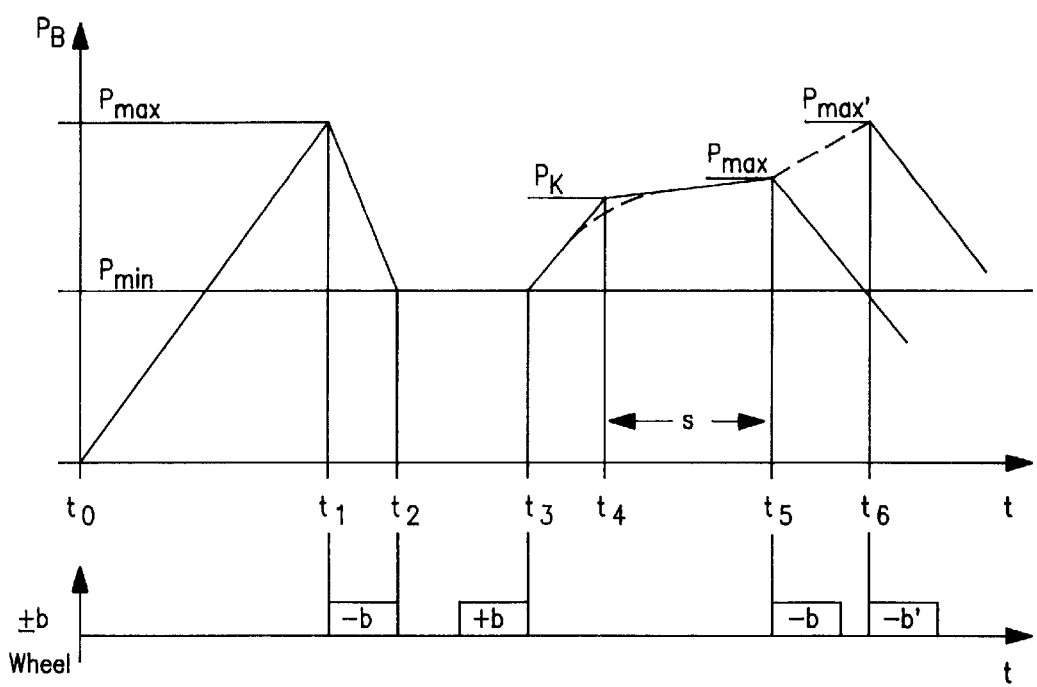
FIG. 2 shows a diagram of the course of brake pressure ($P_B$) over time, as well as wheel acceleration signals (±b) over time.

In FIG. 2, the course of the brake pressure ($P_B$) in the brake cylinder (5) as well as the wheel acceleration and deceleration signals (±b) are shown over time (t).

At the point in time ($t_0$) braking begins, whereby the brake pressure ($P_B$) rises from the value (0) to the value ($P_{max}$)

(deregulating pressure) at point in time ($t_1$). At this point in time ($t_1$), the ABS-electronic system (9) recognizes from an excessive deceleration of the wheel (7) that locking of this wheel is imminent so that a brake regulation cycle is initiated. The deceleration of the wheel (7) at time ($t_1$) exceeds a predetermined threshold, so that an internal deceleration signal (−b) is produced. The pressure in the brake cylinder (5) is then lowered rapidly by the regulator (2) and the control valve (3) during the period ($t_1$) to ($t_2$). This decreases the deceleration of the vehicle wheel (7), as can be recognized in the drop of the deceleration signal (−b) at point in time ($t_2$) (end of the locking tendency). As soon as this signal (−b) has dropped to zero, the lowering of pressure is terminated. The braking pressure ($P_B$) now has the value ($P_{min}$) (holding pressure).

Following the point in time ($t_2$), a pressure holding phase ($t_2$) to ($t_3$) takes place. During this holding of the pressure, the rotational speed of the wheel (7) increases to such an extent that an internal acceleration signal (+b) is generated. At the point in time ($t_3$), this acceleration signal (+b) drops to zero, and from this it can be recognized that the rotational speed of the vehicle wheel (7) has adapted itself substantially to the vehicle speed. For this reason the brake pressure can again be increased after point in time ($t_3$). This occurs in the time period ($t_3$) to ($t_4$) with a steep brake pressure gradient.

The magnitude of this steep gradient as well as the pressure level ($P_K$) at the end of the steep brake pressure restoration phase is, according to the invention, determined as a function of $P_{max}$ and $P_{min}$ of the previous ABS braking cycle. It may also be advantageous to use mean values of $P_{max}$ or $P_{min}$ of the last several, e.g., the last five, braking cycles (ABS regulation cycles) to determine these values.

Thus, the values of $P_{max}$ and $P_{min}$ in the brake cylinder (5) are detected in every braking cycle (ABS regulating cycle) by the pressure sensor (6) and are stored in the electronic system of the EBS regulator (2) or the ABS (9). The regulator (2) or the ABS-electronic system (9), using the stored pressure values, now calculates the optimal course (gradient) of the renewed braking pressure increase which starts at time ($t_3$).

In the case illustrated in FIG. 2, the steep gradient $PG_H$ during the period of time ($t_3$) to ($t_4$) may be calculated according to the following formula:

$$PG_H = K_3 + K_4 (P_K - P_{desired}),$$

where the constant $K_3$ has a value between 5 bar/s and 50 bar/s, the factor $K_4$ has a value between 3/s and 20/s, and the pressure $P_{desired}$ is a desired value of brake pressure prescribed by the ABS (9) to the regulator (2).

The pressure level $P_K$ (pressure at the turning or inflexion point) contained above, and thereby the position of this point, may be calculated according to the following formula:

$$P_K = P_{min} + K_1 (P_{max} - P_{min}),$$

whereby the factor $K_1$ has a value between 0.3 and 0.9.

Using the above calculations to determine the course of the steep rise of restored brake pressure makes it possible to overcome braking hysteresis most comfortably, as the pressure $P_K$ can be brought within proximity of the locking pressure $P_{max}$ without overshooting.

Following the described steep pressure increase, a further pressure increase with low gradient takes place in the period ($t_4$) to ($t_5$). This should bring the brake pressure slowly upwards to the (new) deregulating pressure $P_{max}$ at the point in time ($t_5$). The low gradient $PG_N$ during this latter phase may be calculated in the regulator (2) or ABS (9) according to the following formula:

$$PG_N = K_5 + K_6 \times P_{max}$$

where the constant $K_5$ has approximately the value 1 to 5 bar/s, and the factor $K_6$ has approximately the value 0.3 to 0.9/s.

As a result of the foregoing, an especially long maintenance of the actual brake pressure just below the locking pressure ($P_{max}$) is ensured, so that the braking distance of the vehicle is shortened.

The low increase of brake pressure phase ends at point in time ($t_5$), when the appearance of the wheel deceleration signal (−b) again shows that a locking tendency of the wheel has been detected. In this case, a new pressure regulating cycle begins with a rapid drop of the brake pressure.

However, if after a safety period (s) which starts at the point in time ($t_4$), the (−b) signal has not yet appeared (e.g., road conditions are improving), the brake pressure is again increased substantially with a steep gradient (shown by broken lines) in time period ($t_5$) to ($t_6$) at the end of this period of time (s), until a new value of deregulation pressure ($P_{max}$) has been reached. This is recognized by the appearance of the signal (−b') at point in time ($t_6$). Thereafter the steep lowering of brake pressure starts again as a new regulating cycle begins.

After the above-mentioned safety period (s) has passed, the brake pressure can be adjusted to the new deregulating pressure if the frictional value of the road has increased in the meantime.

It is also advantageous in determining the low gradient $PG_N$ of the brake pressure restoration during the time period ($t_4$) to ($t_5$) to take into account the level of the actual wheel acceleration (+b) which occurs in the time period between ($t_4$) and ($t_5$). For this, the following formula may be used:

$$PG_N = (K_5 + K_6 * P_{max}) \times \frac{(K_7 + b)}{(K_7 - K_8)}$$

where $K_7$ amounts to approximately 0.6 g and $K_8$ to approximately 1.0 g. The constants $K_5$ and $K_6$ have already been given values above.

In this manner, the brake pressure will be increased more slowly in case of large wheel decelerations which approach or exceed the physically possible vehicle deceleration. The brake pressure will be decreased slowly already before a locking tendency is detected, making a rapid drop in brake pressure necessary. This measure will cause an even longer maintenance of the brake pressure until just below the deregulating pressure ($P_{max}$), so that the braking distance is further shortened.

It is also advantageous in determining the low gradient $PG_N$ of resumed brake pressure restoration, to take into account the current road frictional value ($\mu$). The road frictional value ($\mu$) can be evaluated from the formula:

$$\mu = c * P_{max} / N$$

where
c = a characteristic value of the brake indicating the level of the braking force at the wheel for a predetermined braking pressure,
$P_{max}$ = the deregulating pressure, and
N = the wheel load.

In this manner, the course of brake pressure can be changed not only as a function of the physically maximum possible vehicle deceleration, but also on basis of the maximum possible vehicle deceleration due to the currently existing road frictional value. This means that if the wheel deceleration corresponds approximately to the currently existing road frictional value and thereby to the currently possible vehicle deceleration, the brake pressure is not further increased. If the wheel deceleration is greater than the current frictional value, the brake pressure gradient becomes negative, and the brake pressure is lowered. In this manner, a longer maintenance of the brake pressure until just below the deregulating pressure ($P_{max}$) is achieved, especially when road frictional values are low, such as in the case of ice or snow on the road.

Instead of introducing a safety period (s), it is also possible to switch over to a steeper pressure gradient when a brake pressure is attained during the low gradient restoration phase of brake pressure which is higher by a predetermined value than the last deregulating pressure ($P_{max}$) in the preceding regulating cycle. This type of brake pressure increase is more adaptive in the absence of a constant safety period, and therefore leads to greater regulating comfort and improved braking stability.

Tests have furthermore shown that it may be advantageous to control the brake pressure restoration in such manner that at the point in time ($t_4$) no inflexion point occurs in the course of brake pressure restoration, but so that the pressure increase phases with steep gradient and with low gradient merge into each other without a sharp bend. This also results in comfortable regulation and improved utilization of frictional value, as is illustrated by the broken lines in FIG. 2.

For if a constant steep gradient is used, excessive wheel deceleration may occur in case of excessively steep gradients of the brake pressure, even before the inflexion point ($P_K$) is reached, and these steep gradients apparently indicate a tendency to lock up, and therefore prompt the ABS to lower the brake pressure rapidly. This unnecessary lowering of brake pressure leads to reduced utilization of frictional value and therefore lengthens the braking distance. If a continuous, function-like evolution is introduced, the brake pressure can be increased with a very steep gradient when brake pressures are still far below the brake pressure at inflexion point ($P_K$). As a result it is possible, as can be seen in the broken-line representation of brake pressure evolution in FIG. 2, to introduce a brake pressure which is on average higher during an ABS regulating cycle without occurrence of a premature new locking tendency. Thus the braking distance can again be shortened and regulating comfort can be increased.

In the evolution of brake pressure without a sharp bend as described above, the restoration of brake pressure takes place in accordance with the following formula:

$$PG_H = PG_N + K_{10} \frac{(1 - P_{desired})}{P_K}$$

where the constant $K_{10}$ has a value of 25 to 100 bar/s.

The indicated formulas for the calculation of the restoration of brake pressure have proven to be especially advantageous based on driving tests. The calculations are carried out by microcomputers which are contained in the ABS-electronic system (9) or in the EBS electronic system (2).

Figure 3:
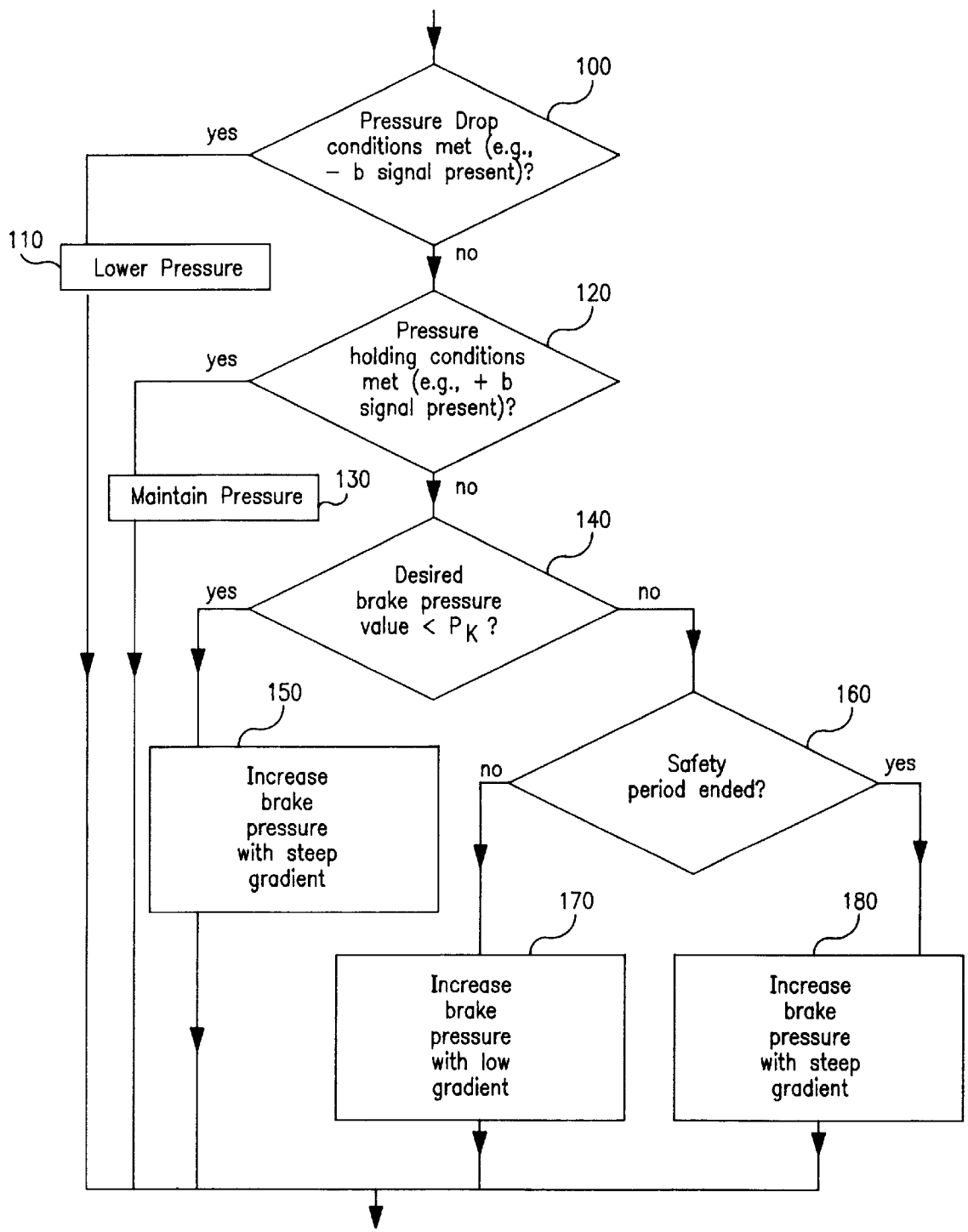
FIG. 3 shows a flow chart for the control of the brake pressure during a pressure restoration phase.

FIG. 3 shows a flowchart such as may be programmed into the above-mentioned microcomputers which adjust the brake pressure during the pressure restoration phase. In a first decision (100), a check is made whether the pressure reduction conditions have been met, e.g., whether a (−b) signal is present. If yes, the pressure is lowered (110). If no, a check is made in a second decision (120) whether pressure maintenance conditions are met, e.g., if a (+b) signal is present. If yes, pressure is maintained (130). If no, a check is made in a third decision (140) whether the desired brake pressure value, i.e., the brake pressure which is calculated or is prescribed by the ABS (9) to the regulator at the point in time in question in the regulator (2) based on the signals received by the ABS (9) is less than the pressure $P_K$ at the inflexion point which was calculated as described above. If yes, pressure is built up with a steep gradient (150).

However, if the desired brake pressure value is equal to or greater than $P_K$, a verification is made in another decision (160) whether the safety period (s) has ended. If this is not the case, the pressure build-up is continued with a low gradient (170), e.g., according to the following formula:

$$PG_N = 2*bar/s + 0.5*1/s*P_{max}.$$

However, if the safety period (s) has already run out, a switch is made to pressure build-up with a steep gradient (180).

The measures described here make it possible to increase the regulating comfort of an ABS braking action, and at the same time to shorten the braking distance of the vehicle.

While the invention has been described by reference to specific embodiments, this was for purposes of illustration only. Numerous alternative embodiments will be apparent to those skilled in the art and are considered to be within the scope of the invention.

We claim:

1. A process for restoring brake pressure in a brake of a motor vehicle having an anti-lock brake system which subjects said brake to a brake regulating cycle when the brake pressure which is measured by means of a pressure sensor reaches a deregulating pressure $P_{max}$, said braking regulating cycle comprising a pressure reduction phase wherein the brake pressure is reduced from said deregulating pressure $P_{max}$ to a holding pressure $P_{min}$, a pressure maintenance phase wherein said holding pressure $P_{min}$ is maintained, and a pressure restoration phase wherein said brake pressure in said brake is increased, said process comprising, storing the deregulating pressure $P_{max}$ and the holding pressure $P_{min}$ applicable during each brake regulation cycle of said anti-lock brake system, following said pressure maintenance phase, increasing the brake pressure in said brake with a steep pressure gradient $PG_H$ in a first pressure increase stage until a pressure level $P_K$ is reached, and thereafter increasing the brake pressure in said brake with a low pressure gradient $PG_N$ in a second pressure increase stage, wherein said steep pressure gradient $PG_H$ is calculated as a function of $P_{max}$ and $P_{min}$ of the last brake regulating cycle, wherein said low pressure gradient $PG_N$ is calculated as a function of $P_{max}$ of the last brake regulating cycle, and wherein said steep pressure gradient $PG_H$ is determined according to the formula $$PG_H = K_3 + K_4(P_K - P_{desired})$$

wherein $K_3$ has a value between 5 bar/s and 50 bar/s, $K_4$ has a value between 3/s and 20/s, and $P_{desired}$ is a desired brake pressure value prescribed by said antilock brake system.

2. The process of claim 1 wherein said pressure level $P_K$ is determined according to the formula $$P_K = P_{min} + K_1(P_{max} - P_{min})$$

wherein $K_1$ has a value between 0.3 and 0.9.

3. The process of claim 1 wherein the low pressure gradient $PG_N$ is determined according to the formula $$PG_N = K_5 + K_6 \times P_{max}$$

wherein $K_5$ has a value between 1 bar/s and 5 bar/s, and $K_6$ has a value between 0.3/s and 0.9/s.

4. The process of claim 3 wherein $PG_N$ is determined according to a formula which also takes into account a wheel acceleration value for the wheel which is braked by said brake.

5. The process of claim 3 wherein $PG_N$ is determined according to a formula which also takes into account a road frictional value.

6. The process of claim 3 wherein following a predetermined time period for said second pressure increase stage, the brake pressure is increased in said brake with a second steep pressure gradient.

7. The process of claim 3 wherein the brake pressure is increased in said brake with a second steep pressure gradient if a brake pressure higher than the deregulating pressure $P_{max}$ in the last regulating cycle is reached during said second pressure increase stage.

8. The process of claim 1 wherein the low pressure gradient $PG_N$ is determined according to the formula $$PG_N = (K_5 + K_6 * P_{max}) \times \frac{(K_7 + b)}{(K_7 - K_8)}$$

wherein $K_5$ has a value between 1 bar/s and 5 bar/s, $K_6$ has a value between 0.3/s and 0.9/s, where $K_7$ and $K_8$ have predetermined values, wherein b is a wheel acceleration value for the wheel braked by said brake, and wherein the term $$\frac{(K_7 + b)}{(K_7 - K_8)}$$

is set to be equal to 1, if wheel acceleration is greater than a predetermined value $K_9$.

9. The process of claim 8 wherein the values of $K_7$, $K_8$ and $K_9$ can vary as a function of road frictional value.

10. A process for restoring brake pressure in a brake of a motor vehicle having an anti-lock brake system which subjects said brake to a brake regulating cycle when the brake pressure which is measured by means of a pressure sensor reaches a deregulating pressure $P_{max}$, said brake regulating cycle comprising a pressure reduction phase wherein the brake pressure is reduced from said deregulating pressure $P_{max}$ to a holding pressure $P_{min}$, a pressure maintenance phase wherein said holding pressure $P_{min}$ is maintained, and a pressure restoration phase wherein said brake pressure in said brake is increased, said process comprising, storing the deregulating pressure $P_{max}$ and the holding pressure $P_{min}$ applicable during each brake regulation cycle of said anti-lock brake system, following said pressure maintenance phase, increasing the brake pressure in said brake with a steep pressure gradient $PG_H$ in a first pressure increase stage until a pressure level $P_K$ is reached, and thereafter increasing the brake pressure in said brake with a low pressure gradient $P_N$ in a second pressure increase stage, wherein said steep pressure gradient $PG_H$ is calculated as a function of the average value of $P_{max}$ and $P_{min}$ for a number of previous brake regulating cycles, wherein said low pressure gradient $PG_N$ is calculated as a function of the average value of $P_{max}$ for a number of previous brake regulating cycles, and wherein said steep pressure gradient $PG_H$ is determined according to the formula $$PG_H = K_3 + K_4(P_K - P_{desired})$$

wherein $K_3$ has a value between 5 bar/s and 50 bar/s, $K_4$ has a value between 3/s and 20/s, and $P_{desired}$ brake pressure value prescribed by said anti-lock brake system.

11. The process of claim 10 wherein said pressure level $P_K$ is determined according to the formula $$P_K = P_{min} + K_1(P_{max} - P_{min})$$

wherein $K_1$ has a value between 0.3 and 0.9.

12. The process of claim 10 wherein the low pressure gradient $PG_N$ is determined according to the formula $$PG_N = K_5 + K_6 \times P_{max}$$

wherein $K_5$ has a value between 1 bar/s and 5 bar/s, and $K_6$ has a value between 0.3/s and 0.9/s.

13. The process of claim 12 wherein $PG_N$ is determined according to a formula which also takes into account a wheel acceleration value for the wheel which is braked by said brake.

14. The process of claim 12 wherein $PG_N$ is determined according to a formula which also takes into account a road frictional value.

15. The process of claim 12 wherein following a predetermined time period for said second pressure increase stage, the brake pressure is increased in said brake with a second steep pressure gradient.

16. The process of claim 12 wherein the brake pressure is increased in said brake with a second steep pressure gradient if a brake pressure higher than the deregulating pressure $P_{max}$ in the last regulating cycle is reached during said second pressure increase stage.

17. The process of claim 12 wherein the low pressure gradient $PG_N$ is determined according to the formula $$PG_N = (K_5 + K_6 * P_{max}) \times \frac{(K_7 + b)}{K_7 - K_8}$$

wherein $K_5$ has a value between 1 bar/s and 5 bar/s, $K_6$ has a value between 0.3/s and 0.9/s, where $K_7$ and $K_8$ have predetermined values, wherein b is a wheel acceleration value for the wheel braked by said brake, and wherein the term $$\frac{(K_7 + b)}{(K_7 - K_8)}$$

is set to be equal to 1, if wheel acceleration is greater than a predetermined value $K_9$.

18. The process of claim 17 wherein the values of $K_7$, $K_8$ and $K_9$ can vary as a function of road frictional value.

19. A process for restoring brake pressure in a brake of a motor vehicle having an anti-lock brake system which subjects said brake to a brake regulating cycle when the brake pressure which is measured by means of a pressure sensor reaches a deregulating pressure $P_{max}$, said brake regulating cycle comprising a pressure reduction phase wherein the brake pressure is reduced from said deregulating pressure $P_{max}$ to a holding pressure $P_{min}$, a pressure maintenance phase wherein said holding pressure $P_{min}$ is maintained, and a pressure restoration phase wherein said brake pressure in said brake is increased, said process comprising, storing the deregulating pressure $P_{max}$ and the holding pressure $P_{min}$ applicable during each brake regulation cycle of said anti-lock brake system, and following said pressure maintenance phase, increasing the brake pressure in said brake with a steep pressure gradient $PG_H$ in a first pressure increase stage until a pressure level $P_K$ is reached, and thereafter increasing the brake pressure in said brake with a low pressure gradient $PG_N$ in a second pressure increase stage, wherein said steep pressure gradient $PG_H$ is calculated as a function of $P_{max}$ and $P_{min}$ for at least one previous brake regulating cycle, wherein said low pressure gradient $PG_N$ is calculated as a function of $P_{max}$ for said at least one previous brake regulating cycle, and wherein said steep pressure gradient $PG_H$ is determined according to the formula $$PG_H = K_3 + K_4(P_K - P_{desired})$$

wherein $K_3$ has a value between 5 bar/s and 50 bar/s, $K_4$ has a value between 3/s and 20/s, and $P_{desired}$ is a desired brake pressure value prescribed by said anti-lock brake system.

20. The process of claim 19 wherein said steep pressure gradient $PG_H$ is calculated as a function of $P_{max}$ and $P_{min}$ of the last brake regulating cycle, and the low pressure gradient $PG_N$ is calculated as a function of the last brake regulating cycle.

21. The process of claim 19 wherein said steep pressure gradient $PG_H$ is calculated as a function of the average value of $P_{max}$ and $P_{min}$ for a number of previous brake regulating cycles, and the low pressure gradient $PG_N$ is calculated as the average value of $P_{max}$ for a number of previous brake regulating cycles.

22. A process for restoring brake pressure in a brake of a motor vehicle having an anti-lock brake system which subjects said brake to a brake regulating cycle when the brake pressure which is measured by means of a pressure sensor reaches a deregulating pressure $P_{max}$, said brake regulating cycle comprising a pressure reduction phase wherein the brake pressure is reduced from said deregulating pressure $P_{max}$ to a holding pressure $P_{min}$, a pressure maintenance phase wherein said holding pressure $P_{min}$ is maintained, and a pressure restoration phase wherein said brake pressure in said brake is increased, said process comprising, storing the deregulating pressure $P_{max}$ and the holding pressure $P_{min}$ applicable during each brake regulation cycle of said anti-lock brake system, following said pressure maintenance phase, increasing the brake pressure in said brake with a steep pressure gradient $PG_H$ in a first pressure increase stage until a pressure level $P_K$ is reached, and thereafter increasing the brake pressure in said brake with a low pressure gradient $PG_N$ in a second pressure increase stage, wherein said steep pressure gradient $PG_H$ is calculated as a function of $P_{max}$ and $P_{min}$ of the last brake regulating cycle, wherein said low pressure gradient $PG_N$ is calculated as a function of $P_{max}$ of the last brake regulating cycle, and wherein the steep pressure gradient $Pg_H$ and the low pressure gradient $PG_N$ satisfy the equation $$PG_H = PG_N + K_{10} \times \frac{(1 - P_{desired})}{P_K}$$

wherein $P_{desired}$ is a desired brake pressure value prescribed by said anti-lock brake system and $K_{10}$ has a value between 25 bar/s and 100 bar/s, so that there is a smooth transition between said first and second pressure increase stages.

23. A process for restoring brake pressure in a brake of a motor vehicle having an anti-lock brake system which subjects said brake to a brake regulating cycle when the brake pressure which is measured by means of a pressure sensor reaches a deregulating pressure $P_{max}$, said brake regulating cycle comprising a pressure reduction phase wherein the brake pressure is reduced from said deregulating pressure $P_{max}$ to a holding pressure $P_{min}$, a pressure maintenance phase wherein said holding pressure $P_{min}$ is maintained, and a pressure restoration phase wherein said brake pressure in said brake is increased, said process comprising, storing the deregulating pressure $P_{max}$ and the holding pressure $P_{min}$ applicable during each brake regulation cycle of said anti-lock brake system, following said pressure maintenance phase, increasing the brake pressure in said brake with a steep pressure gradient $PG_H$ in a first pressure increase stage until a pressure level $P_K$ is reached, and thereafter increasing the brake pressure in said brake with a low pressure gradient $PG_N$ in a second pressure increase stage, wherein said steep pressure gradient $PG_H$ is calculated as a function of the average value of $P_{max}$ and $P_{min}$ for a number of previous brake regulating cycles, wherein said low pressure gradient $PG_N$ is calculated as a function of the average value of $P_{max}$ for a number of previous brake regulating cycles, and wherein the steep pressure gradient $PG_H$ and the low pressure gradient $PG_N$ satisfy the equation $$PG_H = PG_N + K_{10} \times \frac{(1 - P_{desired})}{P_K}$$

wherein $P_{desired}$ is a desired brake pressure value prescribed by said anti-lock brake system and $K_{10}$ has a value between 25 bar/s and 100 bar/s, so that there is a smooth transition between said first and second pressure increase stages.

* * * * *